United States Patent [19]

Dell

[11] 4,424,945

[45] Jan. 10, 1984

[54] PARAFOIL

[76] Inventor: Simon C. Dell, Lodge Cottage, Badwell Ash, Bury St. Edmunds, Suffolk, England

[21] Appl. No.: 377,239

[22] Filed: May 12, 1982

[30] Foreign Application Priority Data

May 15, 1981 [GB] United Kingdom ............... 8115041

[51] Int. Cl.³ .................. B64C 3/30; B64C 31/02; B64D 17/22
[52] U.S. Cl. .................. 244/13; 244/16; 244/139; 244/142; 244/DIG. 1
[58] Field of Search ............... 244/DIG. 1, 4 R, 13, 244/16, 90 R, 139, 142, 145, 146, 215, 219

[56] References Cited

U.S. PATENT DOCUMENTS

| | | | |
|---|---|---|---|
| 1,292,662 | 1/1919 | Sumner et al. | 244/139 |
| 2,061,640 | 11/1936 | Slipikas | 244/139 |
| 3,524,613 | 8/1970 | Reuter et al. | 244/142 |
| 3,945,592 | 3/1976 | Sutton | 244/152 |
| 4,191,349 | 3/1980 | Pravaz | 244/145 |
| 4,261,534 | 4/1981 | Roselli | 244/219 |

FOREIGN PATENT DOCUMENTS

1181279 2/1970 United Kingdom ............... 244/142

OTHER PUBLICATIONS

NASA Technical Note D-2031, "Low Subsonic Flight Characteristics of a Model of a Supersonic Airplane Configuration with a Parawing as a Landing Aid", Johnson, Jr., 1963, pp. 22-23.

*Primary Examiner*—Trygve M. Blix
*Assistant Examiner*—Rodney A. Corl
*Attorney, Agent, or Firm*—Lee, Smith & Jager

[57] ABSTRACT

A parafoil for supporting a flying machine, which parafoil has a forwardly extending central section open at the front to scoop in air during flight, and wings attached to the rear of the central section and which receive air into the interior thereof either directly or from the central section, said wings being divided into compartments of equalized pressure, and restraining elements attached to the parafoil central section in front of the parafoil wings and to the outer ends of the parafoil wings, thereby in flight to hold down the front of the parafoil central section and hold down the parafoil wings in an inverted U-shape.

9 Claims, 7 Drawing Figures

PARAFOIL

FIELD OF THE INVENTION

This invention relates to a parafoil and also to a flying machine in which said parafoil may be incorporated.

PRIOR ART

From U.S. Pat. No. 3,524,613 is known a parafoil in the form of a self-inflating flexible gliding wing. Suspension lines extend downwardly to the load from a large plurality of points distributed across the span of the wing in order to maintain the wing in a shallow curve. A ram air scoop at the leading edge of the wing collects air during flight to maintain inflation of the wing.

OBJECT OF THE INVENTION

The aim of the present invention is to provide an improved parafoil which can be adapted for use as a kite or as the buoyant wing in a simple flying machine such as a glider or low powered aircraft.

BRIEF SUMMARY OF THE INVENTION

According to one aspect of the invention, there is provided a parafoil which comprises a forwardly extending central section open at its front end to collect air during flight, and inflatable lateral wings with provision for access of air to the interior thereof and connected to the central section preferably at or towards the rear thereof and restraining elements attached to the central section, preferably in front of the wings, and to the outer terminals of the wings, thereby in flight to hold down the central section at the front and to hold down the wings in an inverted U-shaped contour.

Preferably the wings are inflated by communication with the central section. Alternatively, however, the wings may also be open at the front to gather air during flight.

According to another aspect of the invention, there is provided a flying machine having a substantially rigid cross structure capable of supporting a load such as a pilot, a self-inflating flexible gliding wing having an air scoop at the front leading edge thereof, at least one relatively long suspension element extending downwardly from the central region of the wing to the central region of the cross structure and means connecting the outer terminals of the wing to the outer ends of the rigid structure, whereby in use the wing is held in an inverted U-shaped contour. Preferably, the gliding wing is in the form of an inflatable central section open at its front end to collect air, and inflatable lateral wings connected to the central section at or towards the rear thereof, with communication for air from the interior of the central section into said wings.

EXPLANATION OF THE INVENTION

The invention differs from the prior art in that the central section, which in itself may be subdivided into a plurality of sections, is the effective equivalent of the known gliding wing, while the wings are, at least in part, inflatable equivalents to the suspension cords which in use maintained such known wing in its shallow curve.

BRIEF SUMMARY OF THE DRAWINGS

Practical embodiments of flying machine incorporating the parafoil in accordance with the invention will now be described by way of example with reference to the accompanying drawings, in which.

DESCRIPTION OF EMBODIMENTS

Figure 1:
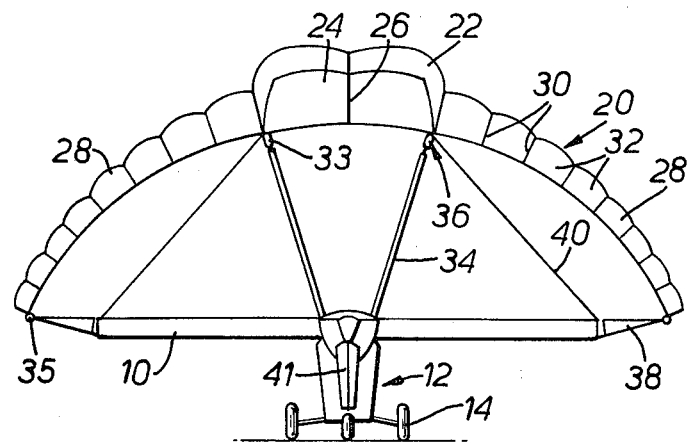
FIG. 1 is a front elevational view of a parafoil flying machine.

Referring first to FIGS. 1 to 4, a flying machine has a cross beam or rigid wing 10 to which is mounted a framework 12 having ground wheels 14 and a seat 16 for a pilot. Although not shown, the rigid wing 10 may have depending fixed flaps at its outer ends to reduce air spillage.

The rigid wing 10 is suspended from a parafoil generally designated 20. The parafoil 20, preferably made of Ripstop nylon, comprises a forwardly projecting inflatable central section 22 open at the front 24 in use to collect air in the manner of a ram air scoop. As also best seen in FIG. 1, the central section is divided by a longitudinal partition 26. However, it may be undivided or have two or more partitions. Lateral inflatable wings 28 project from the rear part of the central section 22, each wing being internally in communication with the interior of said central section to be inflated by the air scooped in by the central section when the machine is travelling. Dividers 30 provided in the wings are of a form which permits free flow of air along the inside of the wings to ensure equalisation of air pressure in all compartments 32. The central section 22 and the terminals of the wings are stiffened front to rear by stiffeners, respectively 33, 35. The central part of the rigid wing 10 carries rigid, upstanding, inclined struts 34 which pivotally connect at 36 to the stiffeners 33 of the central section 22 of the parafoil, towards the open front end thereof. Relatively short struts 38, 39 connect the stiffened terminals 35 of the inflatable wings 28 to the ends of the rigid wing 10. Intermediate cords 40 connect the stiffeners 33 with the rigid wing 10, primarily to prevent any tendency for the struts 34 to collapse together at their upper ends.

Figure 2:
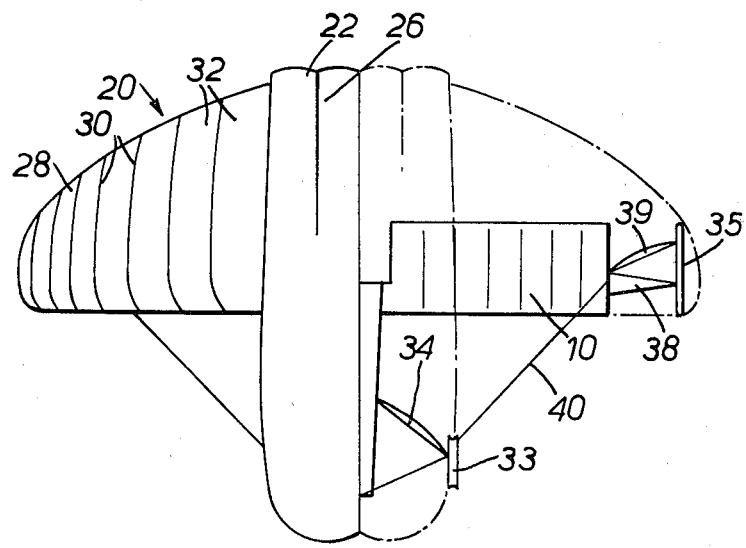
FIG. 2 is a plan view thereof.
Figure 3:
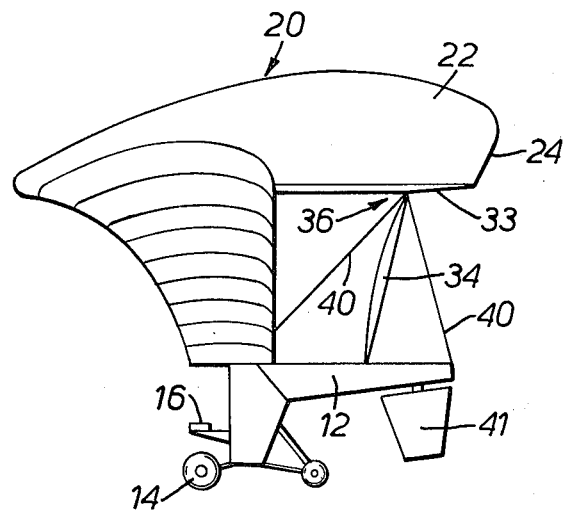
FIG. 3 is a side elevational view thereof.

The struts 34, 38, 39 hold the parafoil in an inverted U-shaped contour, with the central section 22 centrally above the rigid wing 10, which could alternatively be of a delta or swept wing form instead of a straight wing as illustrated, but with a span across the U-shaped arch slightly greater than the span of the rigid wing. In FIG. 2, the parafoil is assumed to be transparent on one side of the machine in order to show the rigid structure underneath. The struts 34 hold down the front of the central section 22 which scoops in air during use.

The machine can be a glider to be towed into the air and manoeuvred by the pilot during a controlled descent. Preferably, however, a light petrol engine, for example a small ducted fan engine, developing about 10 H.P., is mounted to the front or possibly rear of the framework 12, in order to power the machine for take off and during flight.

Control in flight is effected by means of one of the struts 38, 39, in particular the rear strut 39 (see FIG. 2) and a rudder 41 (see FIGS. 1, 3 and 4), possibly with the addition of an elevator and a flap system which will subsequently be described with reference to FIGS. 5 to 7 but is equally applicable to the machine of FIGS. 1 to 4.

On each side of the machine, the rear strut 39 at the end of the rigid wing is articulated to said rigid wing 10 so as to be pivotally adjustable, generally in a vertical plane, to effect twisting of the parafoil in the manner of wing-warping. The respective struts 39 on opposite sides of the machine are coupled for synchronous control by a control cord accessible at the seat 16 for the pilot. The coupling is such that when one strut 39 is moved in one direction, e.g. upwards, to twist the parafoil wing in order to increase lift on one side of the machine, the other strut 39 is oppositely moved, e.g. downwards, to reduce lift on the other side of the machine, thereby affording turning or roll control.

The rudder 41, which operates aerodynamically in the manner of a rudder on a conventional rigid flying machine, is also controllable by a cord accessible to the pilot, and enables unwanted imbalanced drag on the machine, introduced by use of wing-warping, to be compensated or corrected for. If the machine is a glider, the other controls illustrated in FIGS. 5 to 7 may not be required. An elevator for pitch control is to be preferred, but it is possible for the pilot to control pitch by shifting his body forward or back in order to change the effective centre of gravity of the machine.

If desired, all control cords may be lightly tensioned by means of spring drums.

Figure 4:
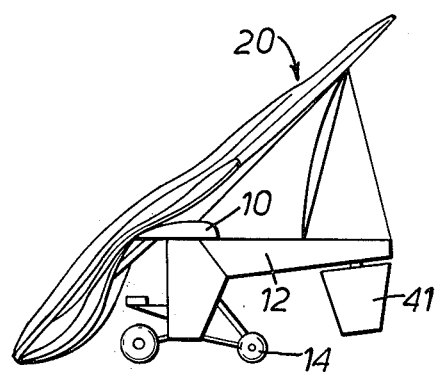
FIG. 4 is a side elevational view with the parafoil collapsed.

When the machine is stationary on the ground, the parafoil automatically tends to collapse to the condition shown in FIG. 4, with the air scoop 24 at the front of the parafoil held open. During run up prior to take off, the parafoil inflates to the condition shown in FIGS. 1 and 3, which inflated condition is maintained during flight.

It should be understood that the number of struts 34 employed can be altered dependent on the construction of the central section 22 of the parafoil, e.g. the number of divisions thereof, and that an additional suspension strut or struts or cord or cords from the rear of the central section may sometimes be desirable.

Tapes (not shown) may be provided which will enable the pilot to collapse and concertina the inflatable wings 28 after landing, thereby to reduce handling problems, especially that of undesired lift off in a strong wind.

Figure 5:
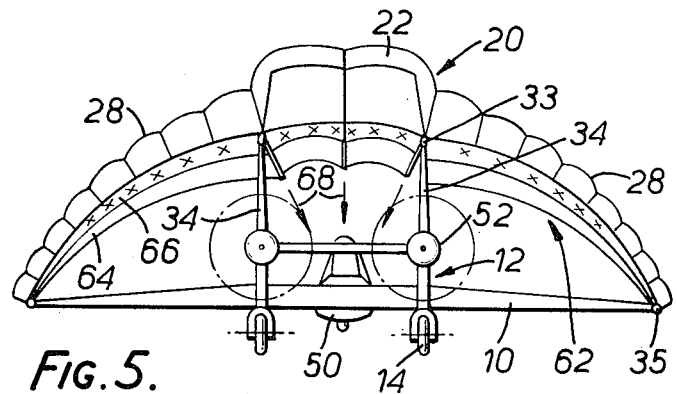
FIG. 5 is a front elevational view of an alternative parafoil flying machine.
Figure 6:
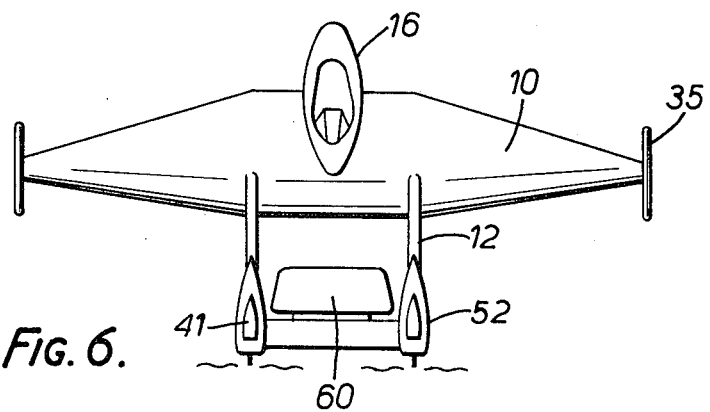
FIG. 6 is a plan view of the rigid framework of the machine.
Figure 7:
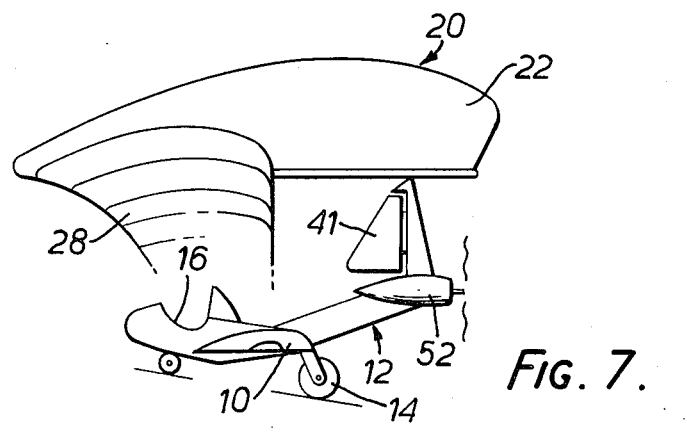
FIG. 7 is a side elevational view of the machine.

In FIGS. 5 to 7 is shown a parafoil flying machine adapted for powered operation by a larger engine. The parafoil is similar and is again referenced 20, but the framework 12 assumes the form of a fuselage 50 with twin engine nascelles 52. The rigid wing 10 is of modified shape, tapering in width to thin outer ends. The terminal ends of the parafoil wings 28 are again stiffened by stiffeners 35. These stiffeners 35 are pivotally connected to the outer ends of the rigid wing to enable roll control by wing warping. The engine nascelles or cowlings 52 support the rigid upstanding struts 34 which are pivotally connected to the stiffeners 33 of the parafoil central section 20. The struts 34 in this construction being of increased rigidity, it is believed that connecting cords equivalent to the cords 40 of the first embodiment are not required.

The important features to be noted in the embodiment illustrated in FIGS. 5 to 7 are the twin rudders 41, now mounted above the respective engine nascelles 52, the elevator or pitch control element 60 and the flap control means generally referenced 62.

The elevator 60 (see FIG. 6) acts in a conventional aerodynamic manner to affect the pitch of the machine during landing, take off and flight. It can be controllable by the pilot through a joy-stick.

The flap control means 62 comprises a strip or flap 64 of Ripstop nylon or equivalent material attached at or near the rear edge of the parafoils (central section 22 and wings 28) through the intermediary of a strip of gauze 66 which permits air flow through it. By means of a single control acting on a number of connecting lines, the flap 64 can be drawn down, as indicated by the arrows 68 in FIG. 5, to increase lift and thus reduce the stalling speed. Thus, the machine of FIGS. 5 to 7 is intended to fly at a higher speed, for example 60 m.p.h. as compared to about 30 m.p.h. for the machine of FIGS. 1 to 4, but may be landed at a lower speed, say about 30 m.p.h., without risk of stalling. The flap control means 62 enables this landing procedure to be effected. The gauze strip 66 improves aerodynamic flow at the rear of the parafoil to which the control flap is attached.

In respects not referred to or described, the parafoil flying machine of FIGS. 5 to 7 is similar to that of FIGS. 1 to 4. Conversely, as previously mentioned, the described elevator 60 and flap control means 62 are applicable to the embodiment of FIGS. 1 to 4.

Various modifications are possible within the scope of the invention. For example, especially when incorporated in a flying machine, the central section may be reduced in length effectively to become the central part of an inflatable gliding wing. Furthermore, communication for air between the central section or central part and the wings is not essential, since the wings also may be open at the front to gather air. Moreover, the invention is not restricted to parafoils for use in flying machines which could, for example, be used in crop spraying and other commercial uses in addition to leisure uses, and the parafoil as hereinbefore described is suitable, for example for dropping a load, said load being attached to the suspension cords which depend from the inflatable central section and the terminals of the inflatable wings. The parafoil can also be used as a kite, e.g. being controlled from a ground held control line, for example to tow a boat.

It is emphasised that the minimisation or avoidance of intermediate suspension cords or shrouds is an important feature of the invention, distinguishing from parafoils such as that disclosed in U.S. Pat. No. 3,524,613. Essentially, this is because the central section 22 is in itself the equivalent of a conventional parafoil, and the wings 28 at least in part take the place of the suspension cords normally provided to maintain the parafoil in shape. Thus the wings 28, while being buoyant, also act as essential components for holding down the central section parafoil 22. Moreover, the absence of stiffening along the lengths of the wings is to be noted; the parafoil assumes its inverted U-shaped contour during use due to inflation by the scooped-in air.

I claim:

1. A parafoil comprising a forwardly extending central section open at its front end to collect air during flight, inflatable wings connected to extend laterally from the central section and having communication means for access of air to the interior thereof from the central section, a rigid structure beneath the parafoil, at least one restraining element attached from the rigid structure to the parafoil central section in front of the wings for holding down the front end of said central section and maintaining the fore/aft position thereof relative to the wing tips during flight and at least one restraining element attached from the rigid structure to the outer terminal of each parafoil wing, the wings being unrestrained between the central section and their terminals so that lift on the wings therebetween is balanced by the tensile forces acting along the length of the wings primarily towards the tips thereof, the complete parafoil thus assuming an inverted U-shape in flight with the central section uppermost.

2. A parafoil according to claim 1, wherein said rigid structure includes a central portion and rigid wing portions extending laterally from said central portion, the first said restraining means attaching to said central portion and the second said restraining means attaching to the outer ends of the wing portions.

3. A parafoil according to claim 2, wherein the parafoil central section has at least one front to rear stiffener and the parafoil wings each have a stiffener at the outer ends thereof, the restraining means connecting to said stiffeners.

4. A parafoil according to claim 1, wherein said rigid structure includes a seat for a pilot, landing means, and an engine.

5. A parafoil according to claim 1, wherein the parafoil wings include front to rear partitions adapted to define a plurality of parafoil wing compartments of equalised pressure.

6. A parafoil according to claim 1, including a flexible flap around the rear edge of the parafoil and control means for adjusting said flap to adjust lift.

7. A parafoil according to claim 1, including means for twisting the outer ends of the parafoil wings to effect roll control by wing-warping.

8. A parafoil according to claim 8, wherein the twisting means includes a pivotal connection between a rigid structure beneath the parafoil and a stiffener at the outer end of each parafoil wing.

9. A parafoil according to claim 8, including a rudder for correcting differential drag introduced by wing-warping.

* * * * *